United States Patent [19]

Hoffrichter et al.

[11] Patent Number: 4,623,973
[45] Date of Patent: Nov. 18, 1986

[54] METHOD AND APPARATUS FOR THE RECOGNITION OF HUES AND COLORS

[75] Inventors: Ingo Hoffrichter, Kiel; Eggert Jung, Schoenberg, both of Fed. Rep. of Germany

[73] Assignee: Dr. Ing. Rudolf Hell GmbH, Fed. Rep. of Germany

[21] Appl. No.: 680,910

[22] Filed: Dec. 12, 1984

[30] Foreign Application Priority Data

Dec. 14, 1983 [EP] European Pat. Off. .......... 83 112577

[51] Int. Cl.$^4$ .......................... G06F 15/70; G01J 3/50; G03F 3/08; G01N 21/25
[52] U.S. Cl. .................................... 364/526; 356/405; 358/80
[58] Field of Search ........ 364/526; 356/402, 405–407; 250/226; 358/28, 30, 31, 75, 80

[56] References Cited

U.S. PATENT DOCUMENTS

| | | | |
|---|---|---|---|
| 3,210,552 | 10/1965 | Young | 250/226 |
| 4,110,826 | 8/1978 | Mollgaard et al. | 365/526 |
| 4,194,839 | 3/1980 | Knop | 356/407 |
| 4,349,279 | 9/1982 | Jung | 364/526 X |
| 4,414,635 | 11/1983 | Gast et al. | 364/526 |
| 4,500,972 | 2/1985 | Kuhn et al. | 358/80 X |
| 4,523,221 | 6/1985 | Chin et al. | 358/28 X |
| 4,535,413 | 8/1985 | Shiota et al. | 358/80 X |
| 4,544,944 | 10/1985 | Chin | 358/28 |
| 4,554,576 | 11/1985 | Kao | 358/28 |

FOREIGN PATENT DOCUMENTS 2628053  6/1978  Fed. Rep. of Germany .

Primary Examiner—William B. Perkey
Attorney, Agent, or Firm—Hill, Van Santen, Steadman & Simpson

[57] ABSTRACT

In electronic reproduction technology, a recognition circuit for hues and colors in colored surfaces is provided. Before the actual hue recognition, the hue to be recognized is selected and its prescribed or measured color values of the RGB color space are transformed by a first color transformation into chrominance values of the chrominance/luminance color space, whereby the transformation coefficients are defined such that the transformed color locus of the hue to be recognized lies on a rotated X'Y' color coordinate system in the chrominance plane. During the actual hue recognition, the colored surface is opto-electronically scanned and the measured color values acquired are transformed into chrominance values by a second color transformation with the transformation coefficients defined in the first color transformation. By selection of chrominance values and by quotient formation of the selected chrominance values, a hue signal which is a measure for hue deviation of the scanned hues from the hue to be recognized is generated. After combination of the hue signal with an auxiliary control signal, a hue recognition signal is formed, this being unequal to zero when the scanned hues lie within a sector-shaped hue recognition region. For color recognition, a color saturation signal and a luminance signal are additionally generated. The color saturation signal and luminance signal are adjustably limited in terms of amplitude and are combined with the hue recognition signal to form a color recognition signal.

23 Claims, 15 Drawing Figures

Hue Deviation

Limiter Stage

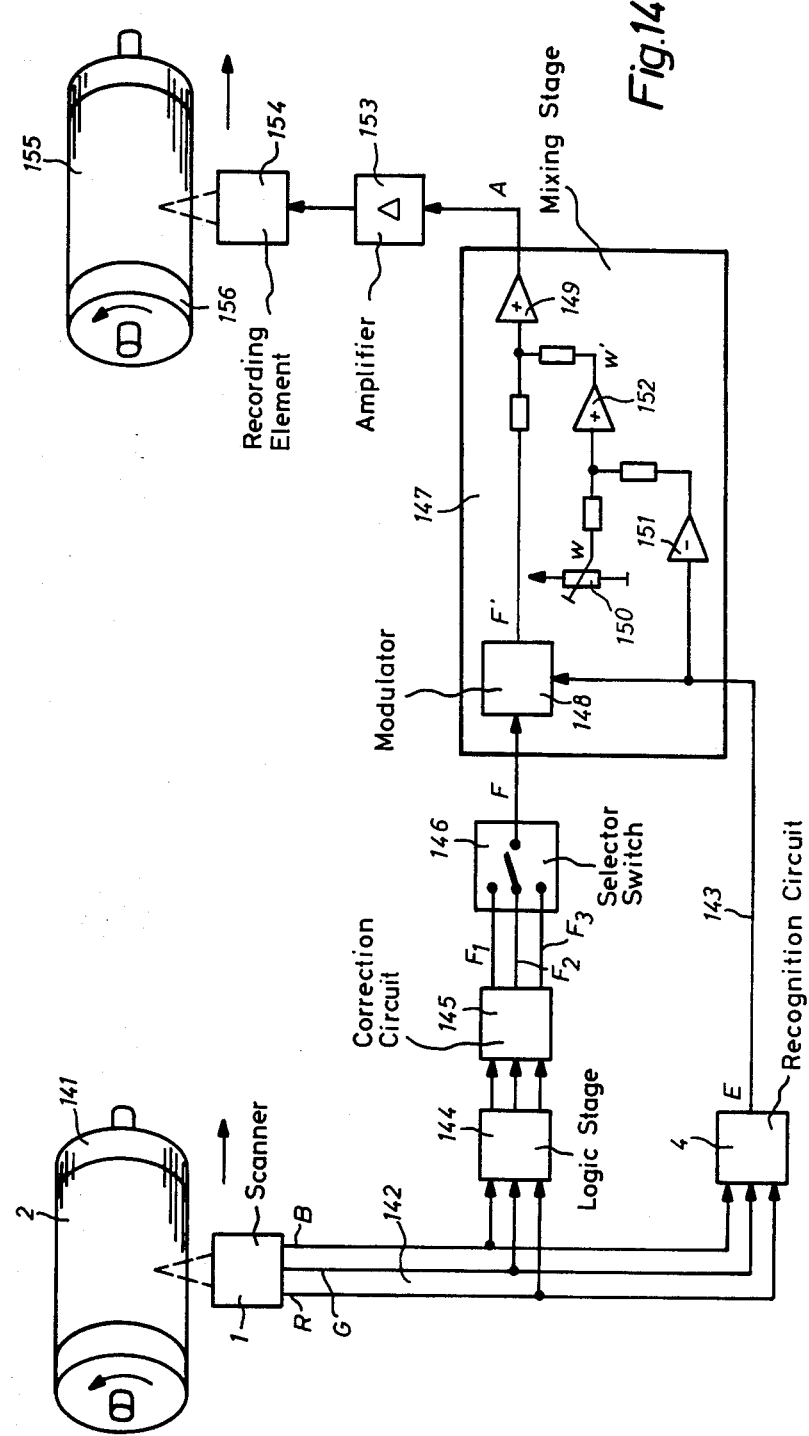

METHOD AND APPARATUS FOR THE RECOGNITION OF HUES AND COLORS

BACKGROUND OF THE INVENTION

The invention relates specifically to the field of electronic reproduction technology and relates to a method for the recognition of hues and colors in colored areas and also relates to a circuit arrangement therefore.

What is to be understood by colored areas are, for example, color originals for electronic reproduction technology, colored pattern designs for the acquisition of control data for textile processing machines, or colored print media.

Before the actual color recognition, color recognition spaces within a color space are defined with the assistance of color recognition circuits around those color locations whose colors within the colored area are to be recognized as individual colors. During the color recognition, the colored area or surface to be analyzed is trichromatically scanned point-by-point and line-by-line and color signals which represent the color coordinates of the color locations of the scanned colors in the color space are acquired by means of opto-electronic conversion of the components of the scan light. By means of evaluating the color signals in the color recognition circuit, a determination is then made with respect to which defined color recognition spaces the color locations of the scanned colors fall and these colors being thus identified.

Such color recognition circuits are employed in reproduction technology in, for example, the production of color separations by means of color scanners for polychromatic mixed printing (multicolor printing) or for single color printing.

In the production of color separations for polychromatic mixed printing, the color signals acquired by means of scanning the color original are converted into color separation signals by means of a basic color correction, the color separation signals being a measure for the intensity of the color application of the printing inks yellow, magenta, cyan, and black in the printing process.

The basic color correction eliminates color errors which result, among other things, due to the different spectral properties of original colors and printing inks and, under given conditions, the desired edited information of the reproduction is modified relative to the original. In addition to the basic color correction, an additional selective color correction is often executed, and very specific colors or hues are designationally corrected.

In selective color correction, there is then the problem of recognizing the color or hues to be specifically corrected with the assistance of color recognition circuits and of deriving selective correction signals from the color recognition signals.

When the color original to be reproduced has a color progression, i.e. differing color saturation and/or brightness within a color or hue, then selective correction signals whose intensity likewise depends on the color progression are required in order to be able to execute progressive or bled, i.e. gradually changing, color corrections.

Apart from polychromatic mixed printing, each individual color to be printed in single color printing which, for example, encompasses textile, decorative, packaging, or porcellan printing, is blended before the printing process, and the various individual colors are then transferred to the print medium in separate operations. In single or individual color printing, there is then the problem of producing a corresponding color separation with the assistance of color recognition circuits for each individual color of the color original to be inked. In this case, a color separation signal must be derived from the color recognition signal.

When it is again a matter of color originals having color progressions, the color separation signal must also be progressive, since it must supply information both with respect to the topical distribution of the inked individual color as well as with respect to the topically different intensity of the color application.

Color recognition circuits are already known from U.S. Pat. No. 3,210,552 and German LP No. 25 44 703 corresponding to U.S. Pat. No. 4,110,826, both incorporated herein by reference, wherein the color recognition spaces within the color space are bounded by means of electrical thresholds. The applicability of a scanned color to one of the bounded color recognition spaces is determined by means of a value-wise comparison to the thresholds of the color signals acquired in the scanning of the color original to be analyzed.

Another type of color recognition has been disclosed in the German OS No. 29 23 468 corresponding to U.S. Pat. No. 4,414,635, incorporated herein by reference. The color recognition circuit herein essentially comprises a color recognition memory in which every color locus of the color space has a memory location allocated to it and every memory location is addressable by the color coordinate triad of the corresponding color locus. Color numbers which identify the colors to be recognized are deposited at the memory locations, so that all of the memory locations or color loci respectively occupied by the same color number form a color recognition space. During the point-by-point and line-by-line scanning of the colored area or surface, the color signal triads thus acquired address the color recognition memory and the addressed color numbers are output, the scanned colors being thus identified.

The aforementioned color recognition circuits emit color recognition signals which merely supply a yes/no statement as to whether a scanned color falls into a defined color recognition space or not. Such color recognition signals are not suitable for generating bled or progressive correction signals and color separation signals.

A further color recognition circuit is known from the German Letters Patent No. 26 28 053, corresponding to U.S. Pat. No. 4,194,339, incorporated herein by reference. The color recognition signal of this circuit, in addition to the yes/no statement, also supplies information with respect to the three-dimensional spacing of the scanned color from a freely selectable center of gravity color within a color recognition space defined around the center of gravity color. Color variations can in fact be recognized with the assistance of this color recognition circuit, but the color recognition spaces cannot be optimally matched in terms of shape and size to the color regions given by the color progression in the color original, so that the color recognition circuit does not supply unequivocal information about the color saturation and/or brightness. The desired, bled or progressive correction signals and color separation signals can therefore likewise not be derived from the color separation signal. A further disadvantage of the known color recognition circuit is that it is not specifically designed for the definition or the recognition of hues, so that optimum selective correction signals and color separation signals cannot be derived for individual hues.

SUMMARY OF THE INVENTION

It is an object of the invention to specify a method and a circuit arrangement for recognition of hues and colors with which recognition spaces can be optimally defined in view of hue and additionally in view of color saturation and brightness. The recognition signals which exactly reproduce the color progression, are generated for the hues and colors.

The invention also enables the exact separation of selected hues from complementary hues and from hues in the gray region. Since the physiological color sensation of man and the definition of the recognition spaces in the specified invention are executed in the concepts hue, color saturation, and brightness, there is a further advantage in that the definition of the recognition spaces can be checked by the operator.

According to the invention, a color locus ($F_0$) of a hue $T_0$ to be recognized is determined by color values ($R_0$, $G_0$, $B_0$). The color locus ($F_0$) of the hue ($T_0$) to be recognized is transformed by a first transformation of its color values ($R_0$, $G_0$, $B_0$) into corresponding chrominance values ($x'_0$, $y'_0$). The color locus ($F_0$) is transformed into a chrominance plane of the chrominance-/luminance color space such that a transformed color locus ($F_0'$) lies on one of the axes of an X'Y' color coordinate system in the chrominance plane. The transformation coefficients required therefor are retained. During actual hue recognition the color surface is scanned point-by-point and line-by-line for acquisition of measured color values (R, G, B). The color loci (F) of the hues of the scanned colors are continuously transformed into the chrominance plane by a second transformation of the acquired measured color values (R, G, B) into chrominance values (x', y'). The color loci are transformed into the chrominance plane with the previously determined and retained transformation coefficients. Those chrominance values (x', y') are selected whose corresponding transformed color loci (F') lie in a same half of the X'Y' color coordinate system as the transformed color locus ($F'_0$) of the hue ($T_0$) to be recognized. A hue signal (T') is acquired by forming a quotient of absolute values of the selected chrominance values (x', y') which respectively correspond to a tangent of an angle ($\beta$) described by the corresponding color coordinate system axis and a connecting line between an origin of the color coordinate system and the transformed color locus (F') of the hue of a scanned color. Accordingly the hue signal (T') is a measure of the respective absolute value-wise deviation in hue of the hue of the scanned color from the hue to be recognized. A hue recognition signal is acquired by combining a substantially constant auxiliary control signal (H) with the hue signal (T'). The hue recognition signal E' has its highest values when scanning the hue ($T_0$) to be recognized and has the value zero when scanning a hue having a prescribed, maximum hue deviation (tan $\beta_g$). Accordingly, a sector-shaped hue recognition region is defined around the corresponding axis segment or around the hue to be recognized.

BRIEF DESCRIPTION OF THE DRAWINGS

FIG. 14 is an applied example in the production of color separations.

DESCRIPTION OF THE PREFERRED EMBODIMENTS

Figure 1:
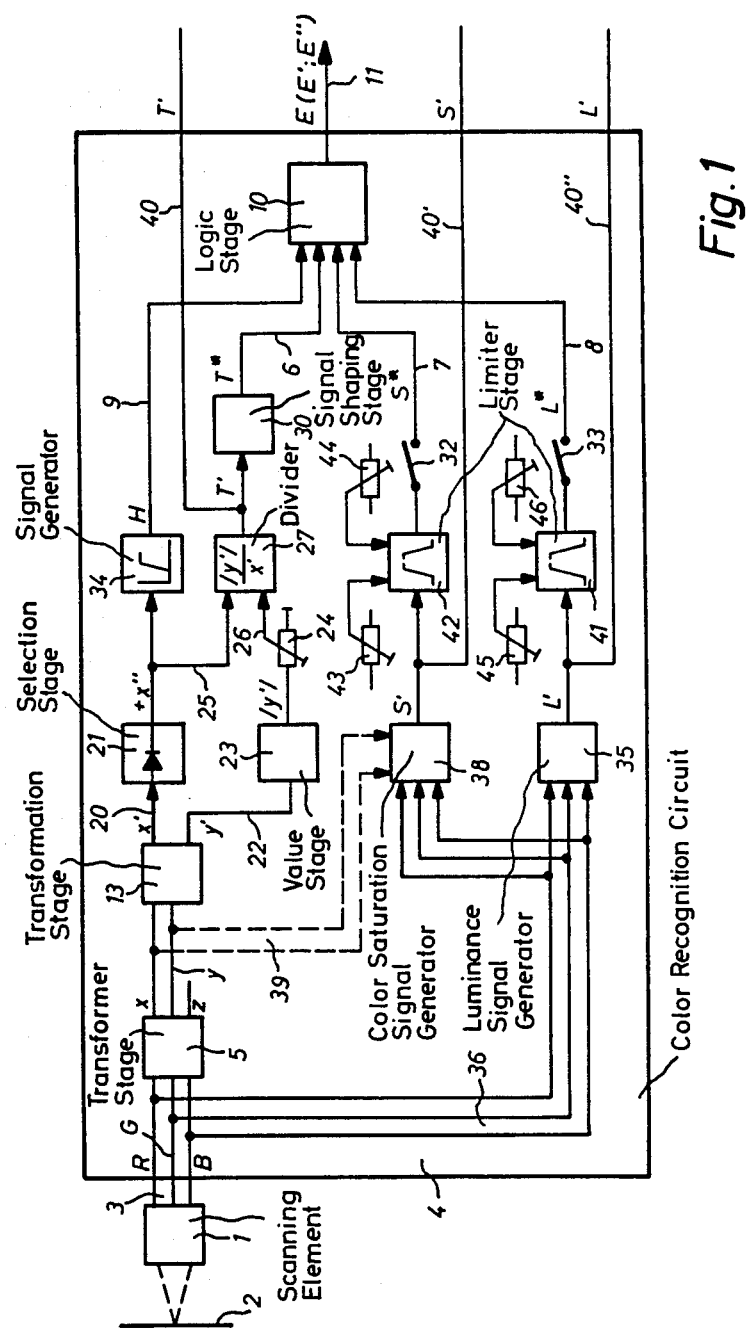
FIG. 1 is an illustrative embodiment of a color recognition circuit.

FIG. 1 shows an illustrative embodiment of a circuit arrangement for the recognition of hues and/or colors.

Figure 8:
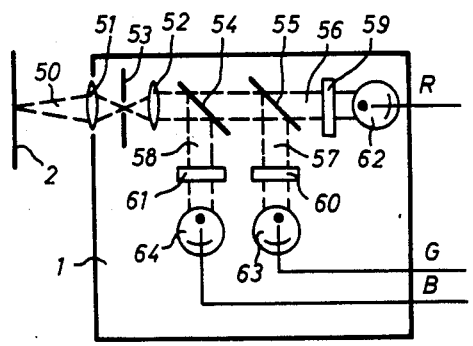
FIG. 8 is an illustrative embodiment of an optoelectronic scanning element.

An opto-electronic scanning element 1 scans an illuminated colored surface, for example a color original 2, whose hues or colors are to be recognized. The color original 2 can be an opaque or a transparency original. The scan light reflected or transmitted by the scanned color original 2 is converted into the measured color value signals R, G, and B in the scanning element with the assistance of color splitters, correction filters and opto-electronic transducers. The measured color value signals R, G, and B are a measure for the intensities of the primary color components "red", "green" and "blue" at the scanned colors. The measured color value signals R, G, and B represent the spatial or color coordinates of the color loci of the scanned colors in the cartesian RGB color space. The scanning element 1 which is displaceable relative to the color original 2 is employed both for measuring the individual color points in the color original 2 as well as for the area-wise, point-by-point, and line-by-line scanning of the color original 2 during the actual color or hue recognition. FIG. 8 shows an illustrative embodiment of a scanning element.

The measured color value signals R, G, and B are supplied via lines 3 to a recognition circuit 4 following downstream of the scanning element 1 and are first logarithmized or partially logarithmized therein in a transformer stage 5 and are corrected according to a gradation curve under given conditions. The logarithmized measured color value signals R', G', and B' are transformed by means of a matrixing according to equations (1) into chrominance signals x and y and into a luminance signal z.

$$x = a_{11}R' + a_{12}G' + a_{13}B'$$

$$y = a_{21}R' + a_{22}G' + a_{23}B'$$

$$z = a_{31}R' + a_{32}G' + a_{33}B' \qquad (1)$$

The matrixing corresponds to a transformation of the color coordinates of the cartesian RGB color space into the color coordinates x, y, and z of the cartesian chrominance/luminance color space, whereby the color coordinates x and y identify the position of the color loci of the colors in the XY color coordinate system of the chrominance plane and the color coordinates z identify the brightness values of the color.

From the supplied signals, the recognition circuit first generates a hue control signal T* on a line 6, a color saturation control signal S* on a line 7, a luminance control L* on a line 8, and an auxiliary control signal H on a line 9.

Hue (T), color saturation (S), and luminance (L) are the cylindrical color coordinates of the hue/saturation/luminance color space, whereby the position of the color loci in the chrominance level thereof are fixed by the hue values T as the angle and by the saturation values S as the radii, whereas the brightness values of the colors are defined by the luminance L. The following relationship therefore exists between the color coordinates x, y, and z of the chrominance/luminance color space and the color coordinate hue T, saturation S, and luminance L of the hue/saturation/luminance color space:

$$T = c_1 \arctan \frac{y}{x} \qquad (2)$$

$$S = c_2 \sqrt{x^2 + y^2}$$

$$L = c_3 z$$

In the recognition circuit 4, the hue control signal T*, the saturation control signal S*, the luminance control signal L* as well as the auxiliary control signal H are combined with one another in a logic stage 10 to form a recognition signal E for hues or colors as an output signal of the recognition circuit 4 on a line 11.

When a hue recognition is to be executed, a sector-shaped hue recognition region is defined in the recognition circuit 4 in the chrominance plane around a hue that is freely selectable in all four quadrants and which is referred to below as center of gravity hue $T_0$. In this case, the recognition signal E on the line 11 is a hue recognition signal E' which is acquired in the logic stage 10 from the hue control signal T* and the auxiliary control signal H. Given the point-by-point and line-by-line scanning of the color original 2 during the actual hue recognition, the hue recognition signal E' supplies a statement regarding the spacing of the hues of the scanned colors from the adjusted center of gravity hue T in case hues of the scanned colors lie within the defined or limited hue recognition region; otherwise, the hue recognition signal E' is equal to zero.

When a color recognition is to be executed, the sector-shaped hue recognition space is also additionally defined or limited in view of the brightness and the color saturation, so that a three-dimensional color recognition region arises around the center of gravity hue $T_0$. In this case, the recognition signal E is a color recognition signal E" which is formed by means of an additional combination of the hue control signal T* and of the auxiliary control signal H, or of the hue recognition signal E', with the saturation control signal S* and/or the luminance control signal L* in the logic stage 10.

The structure and function of the recognition circuit 4 shall be explained in greater detail below, first with reference to the example of a hue recognition.

First, the desired center of gravity hue $T_0$ around which a hue recognition region is to be limited is defined by means of prescribing its measured color values $R_0$, $G_0$, and $B_0$ in the RGB color coordinate system or by means of prescribing its chrominance values $x_0$ and $y_0$ in the XY color coordinate system which are formed by means of matrixing or by means of measuring a sample point in the color original 2 with the assistance of the scanning element 1.

The chrominance values $x_0$ and $y_0$ are transformed into corresponding color coordinates $x'_0$ and $y'_0$ by means of a matrixing according to equations (3) which is adjustable to the selected center of gravity hue $T_0$, whereby the transformation coefficients b, c, d and e are defined such that the conditions $x'_0 > 0$ and $y'_0 = 0$ are met:

$$x'_0 = bx_0 + cy_0$$

$$y'_0 = dx_0 + ey_0 \qquad (3)$$

In the selected illustrative example, transformation coefficients having the form $b = e = \cos \alpha$ and $c = -d = \sin \alpha$ are preferably employed, so that the matrixing corresponds to a rotation of an X'Y' color coordinate system by an angle $\alpha$ relative to the original XY color coordinate system in accordance with equations (4):

$$x'_0 = x_0 \cos \alpha + y_0 \sin \alpha$$

$$y'_0 = x_0 \sin \alpha + y_0 \cos \alpha. \qquad (4)$$

The angle $\alpha_0$ required to meet the conditions $x'_0 > 0$ and $y'_0 = 0$ is defined in a transformation stage 13 by means of an automatic balancing operation given ongoing checking of the conditions $x'_0 > 0$ and $y'_0 = 0$ in a monitoring stage within the transformation stage 13, since the angle $\alpha$ is varied until the monitoring stage has determined that the conditions are met. The determined angle $\alpha_0 = \arctan y_0/x_0$ corresponds to the center of gravity hue $T_0$, and the X' axis of the X'Y' color coordinate system rotated by the angle $\alpha_0$ proceeds through the transformed color locus $F'_0$ of the center of gravity hue $T_0$. The described coordinate rotation corresponds to a rotation of the chrominance/luminance color space around the Z axis.

The determined angle $\alpha_0$ is stored in the transformation stage 13 and is employed in the actual hue recognition for the continuing transformation of the chrominance signals x and y into the rotated chrominance signals x' and y' according to equations (5), whereby the rotated chrominance signal y' differs from zero for all hues of the scanned colors which deviate from the selected center of gravity hue $T_0$ and is equal to zero for all hues that coincide with the selected center of gravity hue $T_0$. It lies within the framework of the invention to execute the matrixing according to equations (1) and (4) in a single step.

$$x' = x \cos \alpha_0 + y \sin \alpha_0$$

$$y' = -x \sin \alpha_0 + y \cos \alpha_0 \qquad (5)$$

Figure 9:
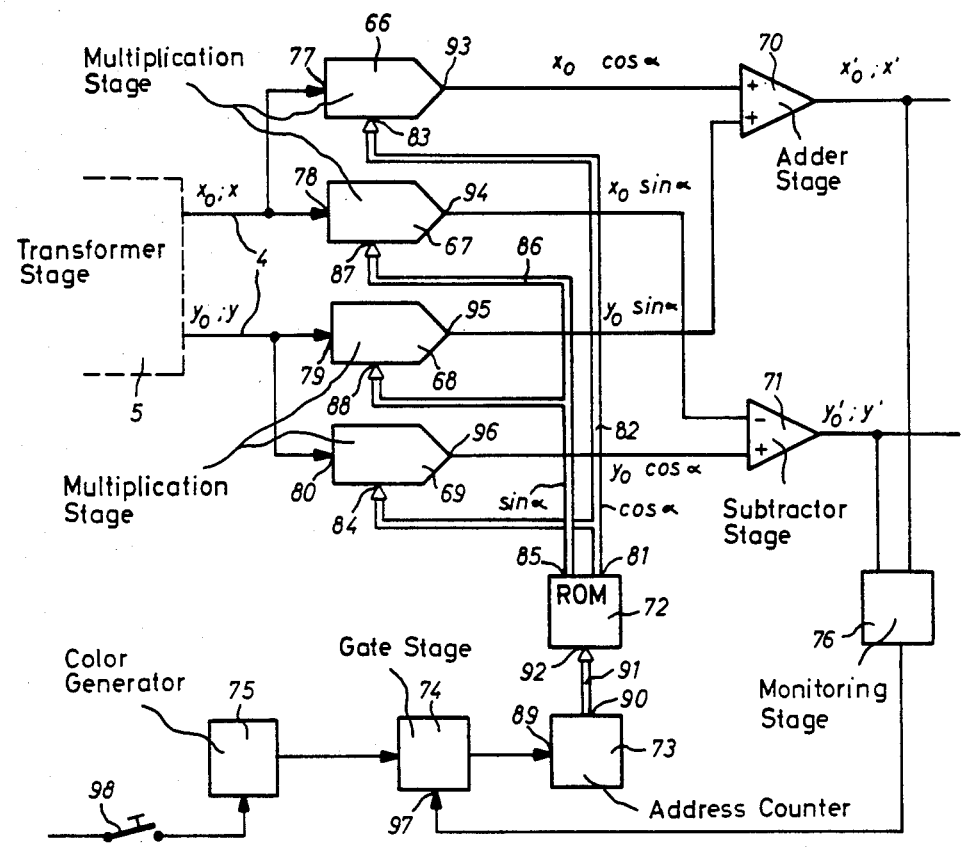
FIG. 9 is an illustrative embodiment of a transformation stage.

A detailed illustrative embodiment of the transformation stage 13 shall be specified in FIG. 9.

Figure 2:
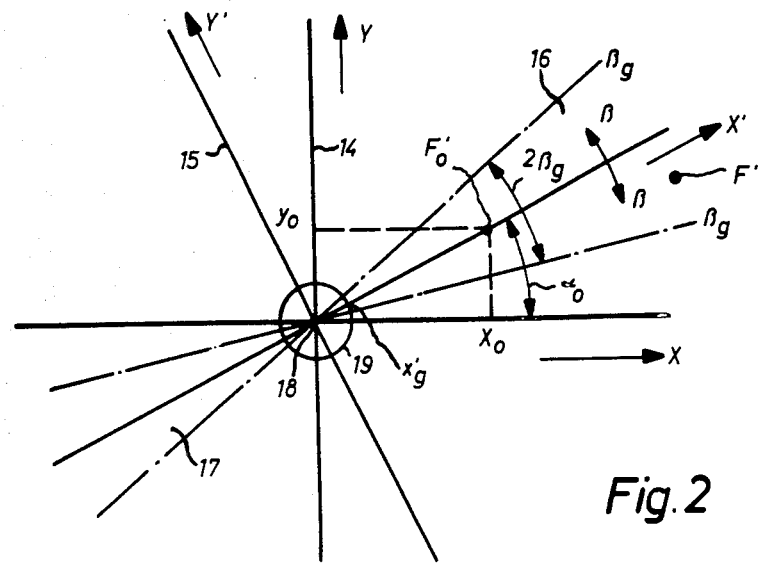
FIG. 2 is a graphic presentation related to coordinate rotation.

The above-described coordinate rotation shall be illustrated again with reference to a graphic presentation in FIG. 2.

FIG. 2 shows the chrominance plane or level of the chrominance/luminance color space with XY color coordinate system 14, whereby the Z axis (gray axis) of the chrominance/luminance color space proceeds perpendicular to the chrominance plane. A transformed color locus F'₀ of a selected center of gravity color point T₀ is defined in the XY color coordinate system 14 by the color coordinates x₀ and y₀. The X'Y' color coordinate system coordinate system 15 rotated by the angle α₀ is shown at the same time, the X' axis thereof proceeding through the color locus F₀ so that the color locus F'₀ in the rotated X'Y' color coordinate system 15 has the color coordinates x'₀>0 and y'₀=0. The angle α₀=arc tan y₀/x₀ corresponds to the center of gravity hue T₀ in the XY color coordinate system 14. A sector-shaped hue recognition region 16 is shown at the same time symmetrical to the X' axis of the rotated X'Y' color coordinate system 15, the critical angle $\beta_g$ (aperture angle $2\alpha_g$) thereof relative to the X' axis being adjustable for localization of the hues to be recognized. For an arbitrary color locus F' within the hue recognition region 16, the rotated chrominance signal x' corresponds to the color saturation in a first approximation given a small angle, and the quotient y'/x'=tan β correspondends to the deviation of the scanned hue from the selected center of gravity hue T₀. Accordingly, the quotient increases with increasing deviation.

FIG. 2 also shows the complementary hues belonging to the localized hues, the complementary hues being within a sector 17 which has arisen by means of mirroring the hue recognition region 16 at the Y' axis of the X'Y' color coordinate system 15. The rotated chrominance signal x' is positive for the localized hues but negative for the complementary hues. Given hue or color recognition, it often proves necessary to define or delimit a cylindrical or barrel-shaped color recognition space for "gray" around the gray axis 18 so that color fluctuations or progressions in the gray are recognized as a uniform gray. FIG. 2 also shows the circular plane of section 19 of such a color recognition space for "gray", the radius thereof being defined by a boundary saturation value x'$_g$.

Referring again to FIG. 1, the rotated chrominance signal x' generated in the transformation stage 13 is supplied via a line 20 to a selection stage 21 in the form of a diode circuit which only transmits the positive values of the rotated chrominance signal x' as signal +x'. A signal always appears at the output of the selection stage 21, thus only when the hue scanned from the color original 2 lies on the side of the delimited or defined hue recognition space 16 with respect to the Y' axis of the rotated X'Y' color coordinate system 15 (FIG. 2). Thus it is not a matter of a complementary hue, so that an exact separation of hues and complementary hues is achieved in an advantageous fashion.

The rotated chrominance signal y' proceeds from the transformation stage 13 via a line 22 to a value stage 23. The absolute value of the rotated chrominance signal y' is formed in the value stage 23 as signal /y'/. The critical angle $\beta_g$ for the desired hue recognition region 16 (FIG. 2) is fixed by means of an amplitude-wise setting of the signal /y'/ by means of a potentiometer 29. The signals +x' and /y'/ are supplied via lines 25 and 26 to a divider stage 27 in which the hue signal T' is acquired by means of quotient formation according to equation (6):

$$T' = \frac{/y'/}{+x'} = \tan \beta \quad (6)$$

The hue signal T' supplies an unequivocal statement regarding the absolute value of the deviation of a hue scanned on the color original 2 from the established center of gravity hue T₀ in both directions, whereby β=0 given hue coincidence.

The usual difficulties in the formation of a hue-identifying signal which result due to the ambiguity of the tangent function and the asymmetry within a quadrant are avoided, and thus a more exact hue separation is achieved in an advantageous fashion by means of the inventive coordinate rotation for the acquisiton of the hue signal T'. The hue signal T' is converted into the hue control signal T* on the line 6 in a signal shaping stage 30 following the divider stage 27.

Figure 3:
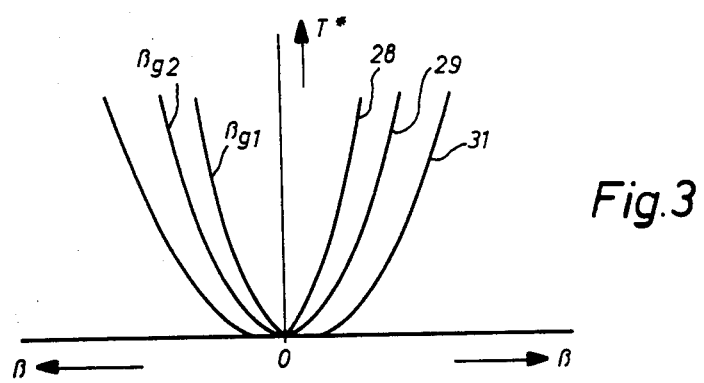
FIG. 3 is a graphic presentation of signal curves.

FIG. 3 shows various curves of the hue control signal T* as a function of the angle β. The curves 28 and 29 result given differently established critical angles $\beta_g$ for the hue recognition region 16 for the case in which no signal influencing occurs in the signal shaping stage 30 and the hue control signal T* corresponds to the hue signal T'. The hue signal T' can still be modified in terms of amplitude and shape with the assistance of the signal shaping stage 30, so that, for example, the hue control signal T* is flattened in accordance with curve 31 in the region of small angles β.

The hue recognition signal E' on the line 11 is acquired in accordance with equation (7) from the hue control signal T* on the line 6 and from the auxiliary control signal H on the line 9, thus being acquired in the logic stage 10 which is designed as a subtraction stage in the illustrative embodiment, whereby the two switches 32 and 33 are situated in the illustrated, open position.

$$E' = H - T^* \quad (7)$$

Alternatively, the combination of auxiliary control signal H and hue control signal T* also occur in multiplicative fashion.

The auxiliary control signal H which is generated in a signal generator 34 has, for example, a constant value H₀ which is then preferably selected H₀=tan y₀/x₀. As in the described illustrative embodiment, however, it is more advantageous to make the auxiliary control signal H dependent on the color saturation, i.e. on the signal +x', in a first approximation. In this case, the auxiliary control signal H=f (x') has the constant value H₀ from the maximum color saturation value up to the proximity of the boundary saturation value x'$_g$ already explained in FIG. 2, and then drops off and has the value zero between the boundary saturation value x'$_g$ and the gray axis (x'=0). FIG. 10 shows an illustrative embodiment of the signal generator 34.

Figure 4:
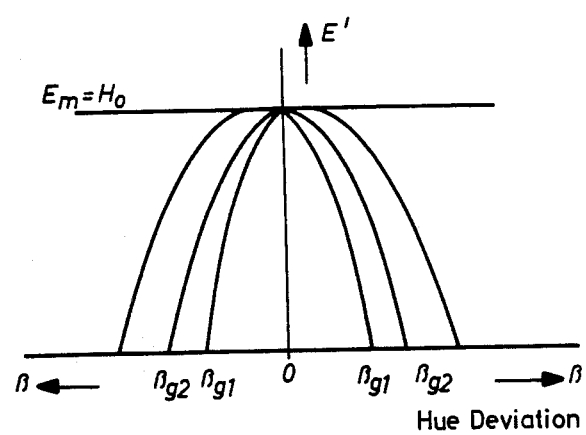
FIG. 4 is another graphic presentation of signal curves.

FIG. 4 shows various curves of the hue recognition signal E' as a function of the angle β for different critical angles $\beta_g$ of the hue recognition regions 16 and for a constant auxiliary control signal H₀ as for that region of the auxiliary control signal H=f (x') lying between the boundary saturation value and the maximum saturation value.

The hue recognition signal E' has a maximum value $E_m = H_0$ for hues which correspond to the selected center of gravity hue $T_0$, said maximum value corresponding exactly to the center of gravity hue $T_0$ given $H_0 = \tan y_0/x_0$.

With increasing deviation of the scanned hues from the center of gravity hue $T_0$, the hue recognition signal E' decreases and reaches the value E'=0 at the respective critical angle $\beta_g$ of the established hue recognition regions.

Alternatively to setting the critical angle $\beta_g$ of the hue recognition region with the assistance of the potentiometer 24, the critical angle can also be set by means of amplitude modification of the hue signal T' in the signal shaping stage 30, or of the value $H_0$ of the auxiliary control signal H in the signal generator 34.

Figure 5:
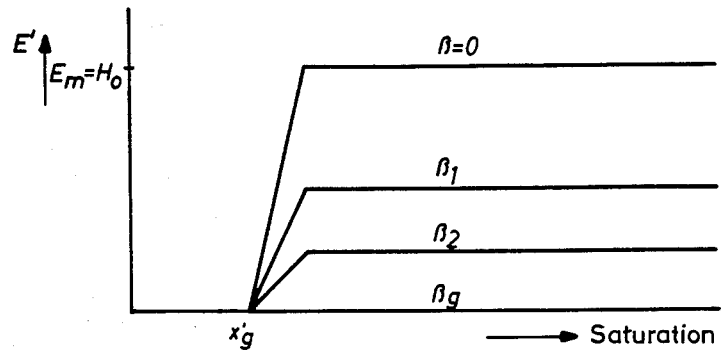
FIG. 5 is a further graphic presentation of signal curves.

FIG. 5 shows various curves of the hue recognition signal E' as a function of the signal x', or of the saturation for that case in which the auxiliary control signal H=f (x') and the angle $\beta$ are parameters. A limitation corresponding to "gray" is achieved in an advantageous fashion by means of the dependency of the hue recognition signal E' on the color saturation.

A dependency of the hue recognition signal E' on the color saturation can be alternatively achieved wherein the hue control signal T* is combined in multiplicative fashion with the signal +x' in the logic stage 10.

When a color recognition is executed, a three-dimensional color recognition region must be demarcated in the hue/saturation/luminance color space, the sector-shaped hue recognition region being additionally bounded with respect to brightness and/or the saturation.

For localization with respect to the luminance, a luminance signal L' is acquired in the recognition circuit 4 in a luminance signal generator 35 to which the measured color value signals R, G, and B are supplied via the lines 36, and is acquired from at least one, and preferably all three measured color value signals R, G, and B according to the relationship $L' = f_1 R + f_2 G + f_3 B$. The luminance signal z formed in the transformation stage 5 can also be used as luminance signal L' in case all three measured color value signals R, G, and B participate in the formation of the luminance signal L'. In this case, the luminance signal generator 35 can be omitted.

Figure 11:
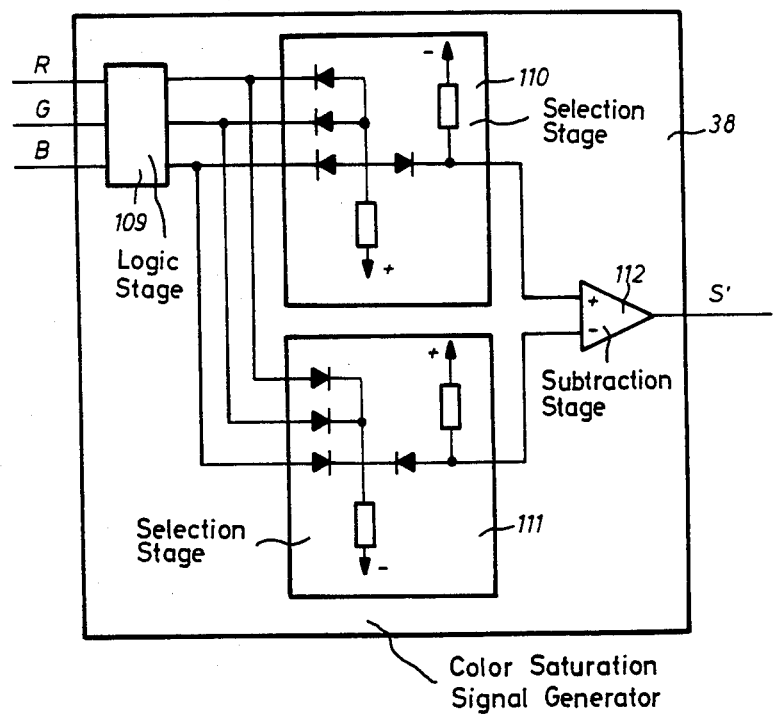
FIG. 11 is an illustrative embodiment of a color saturation signal generator.

For localization with respect to the color saturation, a color saturation signal generator 38 generates a saturation signal S'. An illustrative embodiment of the color saturation signal generator 38 is shown in FIG. 11. The saturation signal S' can be acquired according to the equation $S' = \sqrt{x^2 + y^2}$ from the chrominance signals x and y formed in the transformation stage 5, these being supplied to the color saturation signal generator 38 via the lines 39 shown with broken lines. In this case, the saturation signal S' reproduces the exact color saturation values. The color saturation signal generator 38 then contains corresponding arithmetic modules (squares, adders, evolution units) which, however, do not permit a high working speed. In order to avoid this difficulty, a saturation signal S' approximated to the exact saturation signal values is utilized in an advantageous fashion. In this case, the approximated saturation signal S' is derived from the measured color value signal R, G, and B supplied to the color saturation signal generator 38 via the lines 36. This is derived therefrom since the maximum and the minimum measured color value signals are continuously identified in the color saturation signal generator 38 and the difference of the extreme values is formed, this approximately corresponding to the saturation signal S', since the maximum measured color value signal of a scanned color respectively represents the color saturation and the minimum measured color value signal represents the gray scale of this color. Since the color saturation signal generator 38 now does not contain the arithmetic modules cited above, the working speed of the circuit arrangement and thus the scan rate for the color original 2 to be analyzed can be increased in an advantageous fashion by means of the cited signal formation. In case a rougher approximation is allowed in the formation of the saturation signal S', the signal x' can also be employed instead of the color saturation signal S'.

The hue signal T', the saturation signal S', as well as the luminance signal L' are conducted via lines 40, 40', and 40" to the output of the recognition circuit 4 for an applied example of the recognition circuit 4 to be explained later.

Figure 12:
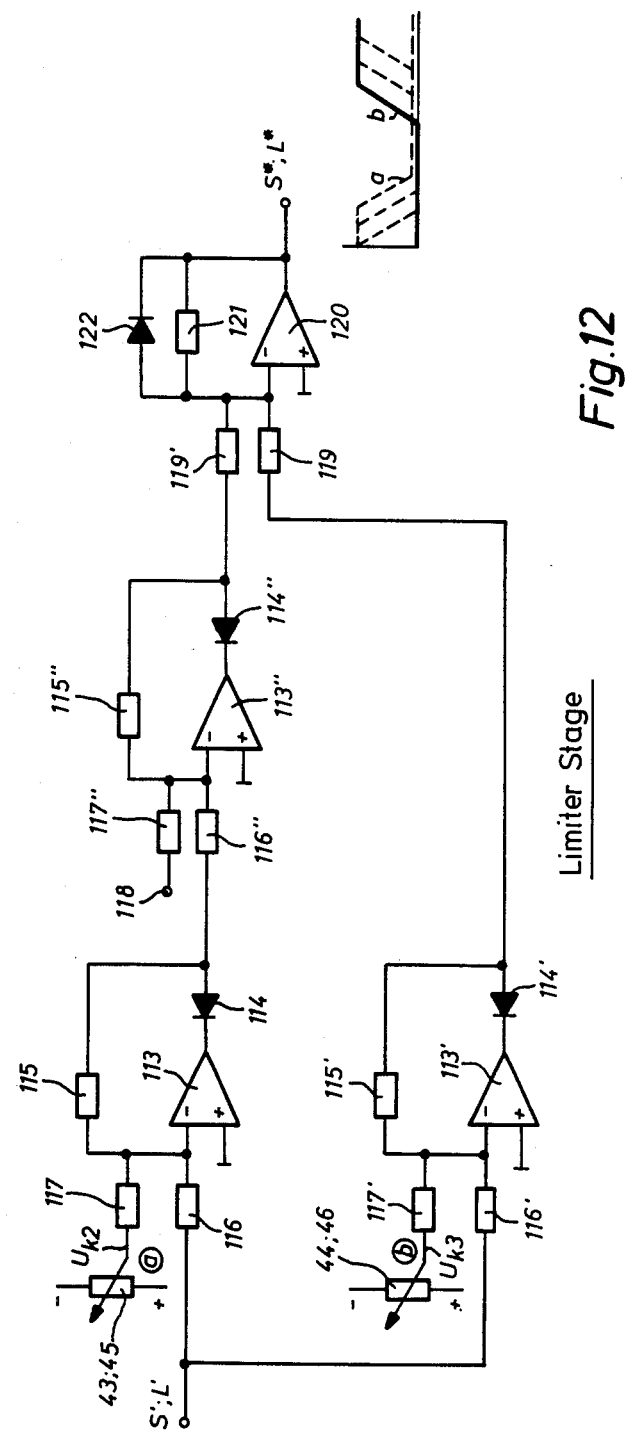
FIG. 12 is an illustrative embodiment of a limiter stage.

The luminance signal generator 35 is followed by a limiter stage 41 in which the luminance control signal L* is formed from the luminance signal L'. The color saturation signal generator 38 is likewise followed by a corresponding limiter stage 42 which converts the color saturation signal S' into the color saturation control signal S*. The formation of the luminance control signal L* and of the color saturation control signal S' with the assistance of compensating voltages that can be set at potentiometers 43 and 44 of 45 and 46. At the same time, the luminance signal L' and the color saturation signal S' can also be varied in terms of amplitude and/or non-linearly varied according to gradation curves in the limiter stages 41 and 42. FIG. 12 shows an illustrative embodiment of the identically constructed limiter stages 41 and 42.

The luminance control signal L* on the line 8 and/or the color saturation control signal S* on the line 7 are forwarded via the switches 32 and 33 to the logic stage 10 in which the color recognition signal E" on the line 10 is generated according to equation (8).

$$E'' = H - T^* - L^* - S^*$$

$$\text{or } E'' = E - L^* - S^* \quad (8)$$

Alternatively, the combination of hue recognition signal E' with the luminance control signal L* and/or the color saturation signal S* can also occur in multiplicative fashion.

The luminance values and color saturation values at which the luminance and the color saturation of the scanned colors influence the curve of the color recognition signal E" can be determined in the demarcation of the color recognition regions with the assistance of the potentiometers 43 through 46 at the limiter stages 41 and 42.

A selection of the signals which are to participate in the formation of the color recognition signal E" can also be undertaken with the assistance of the switches 32 and 33.

The curve of the color recognition signal E" with respect to the hue of the scanned colors correspond to the curve of the hue recognition signal E" shown in FIG. 4 when luminance and color saturation are left out of consideration.

Figure 6:
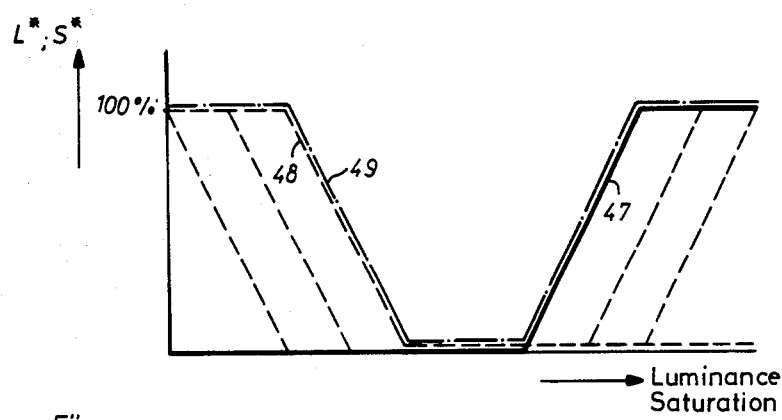
FIG. 6 is another graphic presentation of signal curves.

FIG. 6 shows various curves of the luminance control signal L* dependent upon the luminance or the color saturation control signal S* dependent on the color saturation, which can be set by means of the potentiometers 43 through 46 at the limiter stages 41 and 42.

Figure 7:
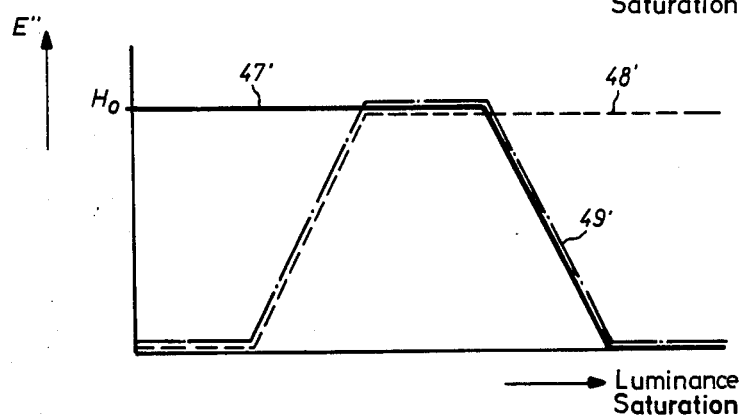
FIG. 7 is a further graphic presentation of signal curves.

FIG. 7 shows the corresponding curves of the color recognition signal E" dependent upon the luminance or the color saturation. In order to simplify the illustration, it has been assumed that the scanned hue precisely corresponds to the selected center of gravity hue $T_0$.

When it is essentially dark colors that are to be recognized, the curve 47, for example of the luminance control signal L8, is set with the assistance of one of the potentiometers at the limiter stage 41, the curve 47' of the color recognition signal E" thereby resulting. In this case, the color recognition signal E", given dark colors, has a high signal level and the signal limitation does not begin until lighter colors.

When on the other hand, it is essentially light colors that are to be recognized, the curve 48, for example, is set with the assistance of the other potentiometer at the limiter stage 41, and the curve 48' of the color recognition signal E" results. In this case, the color recognition siganl E" has a high signal level given light colors, this being limited in the direction toward dark colors. In this fashion, light and dark colors can be exactly separated from one another in an advantageous fahsion, For the demarcation of a luminance region, the curve 49 of the luminance control signal L* can also be generated with the assistance of both potentiometers at the limiter stage 41. In this case, the color recognition signal E" has the curve 49', a limitation toward light and dark colors around colors of moderate luminance being thus achieved. Colors which lie in or near the chrominance plane or level can thus be essentially recognized.

A demarcation of the scanned colors with respect to lower or higher color saturation values as well as with respect to a color saturation region can be undertaken by means of an analogous setting of the potentiometers at the limiter stage 42.

FIG. 8 shows an illustrative embodiment of the opto-electronic scanning element 1. The scan light 50 reflected or transmitted by the color original 2 proceeds through lenses 51 and 52 and through a diaphragm 53 into the scanning element 1 and is split into three sub-beams 56, 57, and 58 therein by means of two dichroitic color splitters 54 and 55. The sub-beams 56, 57, and 58 are incident through corrective color filters 59, 60, and 61 into three opto-electronic transducers 62, 63, and 64 which convert the received sub-light into the primary measured color value signals R, G, and B in accordance with the intensities of the primary color constituents in the scanned colors.

FIG. 9 shows an illustrative embodiment of the transformation stage 13.

In the transformation stage 13, the chrominance signals $x_0$ and $y_0$ of the selected center of gravity hue $T_0$ are rotated during a balancing operation by means of monotonous variation of the angle $\alpha$ until the rotated chrominance signals are $x'_0 > 0$ and $y'_0 = 0$, whereby the angle thus found is retained. This coordinate rotation is executed in accordance with equation (4).

The continuously generated chrominance signals x and y are then rotated in accordance with equation (5) during the point-by-point and line-by-line scanning of the color original to be analyzed.

The transformation stage 13 is composed of four multiplication stages 66, 67, 68, and 69, of an adder stage 70, of a subtractor stage 71, of a read-only memory 72, of an address counter 73, of a gate stage 74, of a clock generator 75, and of a monitoring stage 76.

The multiplication stages 66, 67, 68, and 69 are advantageously constructed of multiplying digital-to-analog converters, for example of integrated modules of the type AD 7542 of Analog Devices. A selectable factor in the form of digital values can be input into such a multiplying digital-to-analog converter via a data input, these digital values being storable in an internal register. An analog signal present at the input of the multiplying digital-to-analog converter is multiplied by the established factor, whereby the product is again available as an analog signal at the output of the multiplying digital-to-analog converter.

During the balancing operation, the chrominance signal $x_0$ coming from the transformer stage 5 indicated with broken lines is forwarded to the inputs 77 and 78 of the multiplication stages 66 and 67, whereas the chrominance signal $y_0$ proceeds to the inputs 79 and 80 of the multiplication stages 68 and 69.

The corresponding sine and cosine values for angular values $\alpha$ from 0° through 360° are stored in the read-only memory 72 as digital values $b = e = \cos \alpha$ and $c = d = \sin \alpha$. They are stored therein so as to be callable by the corresponding angular values $\alpha$ as addresses of the read-only memory 72. The data output 81 of the read-only memory 72 for the digital values $b = e = \cos \alpha$ is connected via a data bus 82 to the data inputs 83 and 84 of the multiplication stages and the corresponding data output 85 for the digital values $c = d = \sin \alpha$ are connected via a data bus 86 to the data inputs 87 and 88 of the multiplication stages 67 and 68.

The engageable clock generator 75 communicates via the data stage 74 with the clock input 89 of the address counter 73. The output 90 of the address counter is connected via an address counter is connected via an address bus 91 to the address input 92 of the read-only memory 72. The outputs 93 and 95 of the multiplication stages 66 and 68 are in communication with the adder stage 70, and the outputs 94 and 96 of the multiplication stages 67 and 69 are in communication with the subtractor stage 71. The output of the adder stage 70 and the output of the subtractor stage 71 are connected to the monitoring stage 76 for the conditions $x'_0 > 0$ and $y'_0 = 0$. The monitoring stage 76 is in communication with a control input 97 of the gate stage 74.

The balancing operation is initiated by means of switching on the clock generator 75 with the assistance of a key 98. The counting clock of the clock generator 75 is counted into the previously reset address counter 73, whereby the incrementing counter reading corresponds to monotonously increasing angular values $\alpha$. The address counter 73 successively calls in the addresses of the read-only memory 72. The digital values $\cos \alpha$ and $\sin \alpha$ associated with the angular values $\alpha$ are transferred into the multiplication stages 66, 67, 68, and 69, and are multiplied therein by the corresponding chrominance signals $x_0$ and $y_0$. The individual products are added to or subtracted from one another according to equation (4), so that the rotated chrominance siganl $x'_0$ appears at the output of the subtractor stage 71. The rotated chrominance signals $x'_0$ and $y'_0$ are continuously checked by the monitoring stage 76. The monitoring stage 76 emits a control signal to the gate stage 74 when the conditions are met, the counting clock being thus interrupted. The counter reading which is reached and fixed in the address counter 73 corresponds to the desired angle $\alpha_0$.

Figure 10A:
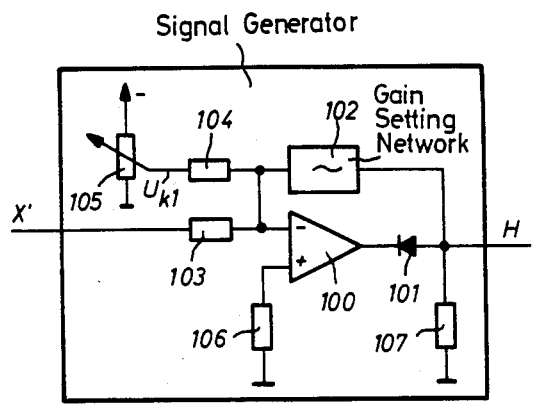
FIG. 10a is an illustrative embodiment of a signal generator.

FIG. 10a shows an illustrative embodiment of the siganl generator 34 for generating the auxiliary control signal H dependent upon the signal x'.

The signal generator 34 is composed of an inverting amplifier 100 whose output is connected via a diode 101 and via a network 102 to the inverting input of the amplifier 100. The inverting input of the amplifier 100 is also connected via a first summing resistor 104 to a potentiometer 105. A compensating voltage $U_{k1}$ which corresponds to the desired boundary color saturation value $x'_g$ can be set at the potentiometer 105. The non-inverting input of the amplifier 100 is applied to grounded potential via a resistor 107. Given values of the signal x' which are smaller in terms of amount than the compensating voltage $U_{k1}$, the auxiliary control signal is H=0. When the signal x' reaches the compensating voltage $U_{k1}$ in terms of amount, the auxiliary control signal H rises in accordance with the gain set in the network 102 and then reaches a limit value $H_0$ likewise prescribed by the network 102.

Figure 10B:
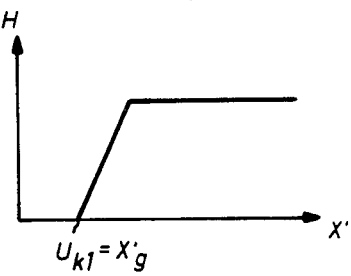
FIG. 10b is a graphic presentation of an output of the signal generator.

FIG. 10b shows the curve of the auxiliary control signal H at the output of the signal generator 34 for generating the auxiliary control signal H dependent upon the signal x'.

FIG. 11 shows an illustrative embodiment of the color saturation signal generator 38 for generating the color saturation signal S' from the measured color value signals R, G, and B.

The measured color value signals R, G, and B supplied by the scanning element 1 (not shown) are logarithmized or partially logarithmized in a logarithmizing stage 109 and are simultaneously supplied to a maximum selection stage 110 and to a minimum selection stage 111 which respectively determine the maximum or minimum measured color value signals from the measured color value signals R, G, and B. In a subtraction stage 112 following the maximum selection stage 110 and the minimum selection stage 111, the color saturation signal S' which approximately corresponds to the color saturation is formed as a differential signal from the identified maximum and minimum measured color value signals.

FIG. 12 shows an illustrative embodiment of the limiter stage 41 or 42, respectively.

The limiter stage is composed of three identically constructed, inverting amplifiers, 113, 113', and 113". The outputs of the amplifiers are respectively connected via diodes 114, 114', and 114" and via resistors 115, 115' and 115", to the inverting inputs of the amplifiers 113, 113', and 113". The inverting inputs of the amplifiers 113 and 113' are connected in common via summing resistors 116 and 116' with the color saturation signal S' or the luminance signal L'. The inverting input of the amplifier 113 is connected via a summing resistor 117 to the potentiometers 43 or 45, and the inverting input of the amplifier 113' is connected via a further summing resistor 117' to the potentiometers 44 or 46. The inverting input of the amplifier 113" is connected to the output of the amplifier 113 via a summing resistor 116" and to a positive voltage source 118 via a further summing resistor 117". The outputs of the amplifiers 113' and 113" are in communication via summing resistors 119 and 119' with the inverting outputs of a limiting amplifier 120 whose output is coupled to the inverting input via a parallel connection of a resistor 121 and a limiting diode 122. The color saturation control signal S* or the luminance control signal L* having the curves shown in FIG. 6, are available at the output of the limiting amplifier 120. Compensating voltages $U_{k2}$ and $U_{k3}$ which define the cut-in points of the voltage limitation are set with the potentiometers 43 or 45 and 44 or 46, respectively.

Figure 13:
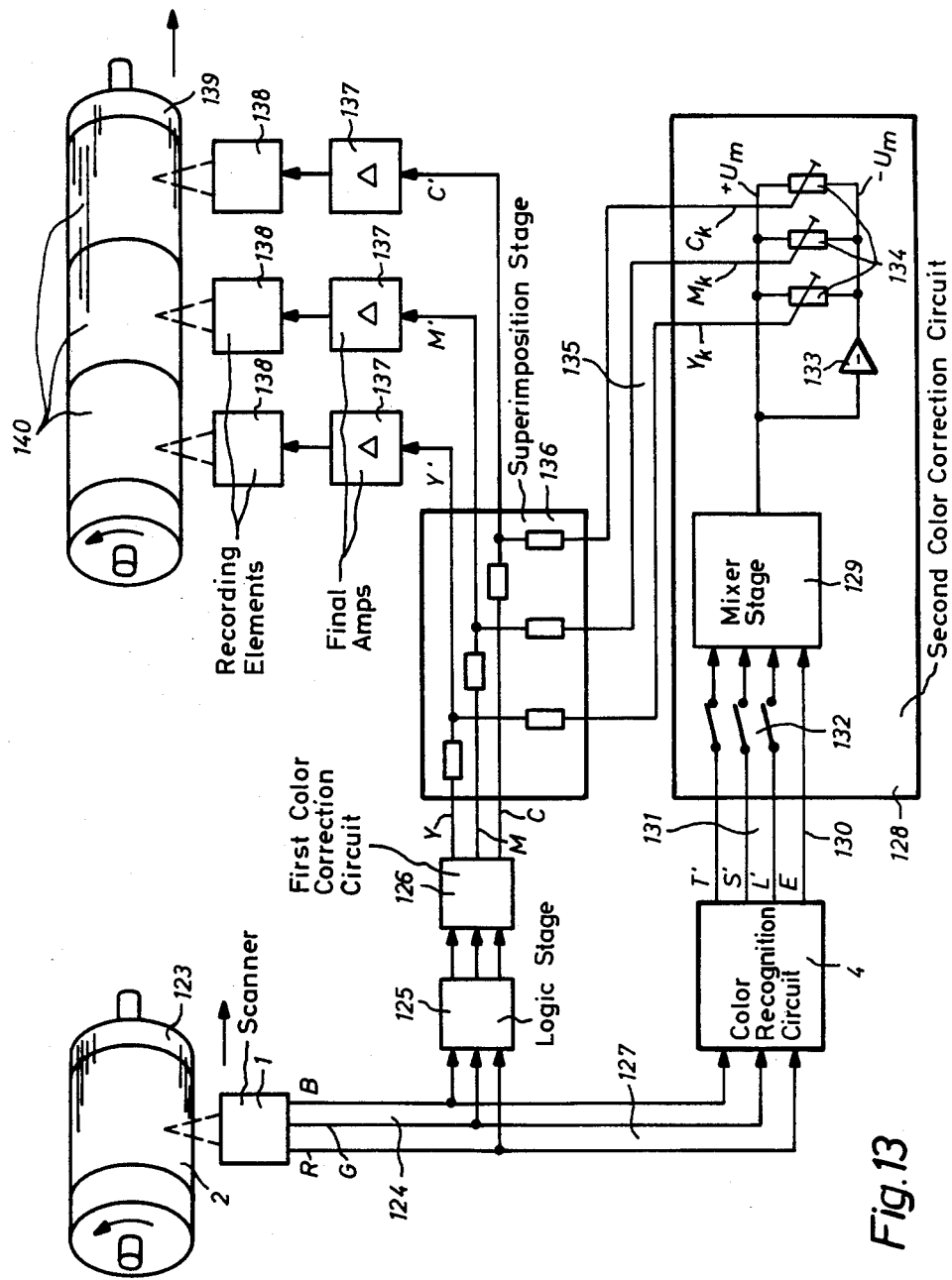
FIG. 13 is an applied example given color correction.

FIG. 13 shows an applied example of the circuit arrangement for the recognition of hues or colors given selective color correction in a color scanner with which color separations for polychromatic mixed printing (paper printing) are produced.

The color original 2 from which the color separations are to be produced is clamped to a rotating scanner drum 123 of a color scanner (not shown in greater detail) and is trichromatically scanned by the opto-electronic scanning element 1 which moves axially along the scanner drum 123. The measured color value signals R, G, and B acquired by means of the scanning of the original proceed via lines 124 and a logarithmizing stage 125 to a first color correction circuit 126 for basic color correction in which the measured color value signals R, G, and B are converted according to the laws of subtractive color mixing into the color separation signals Y, M, and C for recording the color separations "yellow", "magenta" and "cyan" and, under given conditions, are also converted into the color separation signal K for recording the color separation "black".

The measured color value signals R, G, and B are simultaneously supplied via lines 127 to the recognition circuit 4 constructed in accordance with FIG. 1 at whose outputs the recognition signal E (the recognition signal E' or color recognition signal E") as well as the hue signal T', the color saturation signal S', and the luminance signal L' are available. The output signals of the recognition circuit 4 are forwarded to a second color correction circuit 128 for selective color correction.

The second color correction circuit 128 comprises a mixer stage 129 which is charged with the recognition signal E via a line 130 as well as with the hue signal T', the color saturation signal S', and the luminance signal L' via lines 131 and switches 132. A positive signal $+U_m$ is formed in the mixer stage 129 which, for example, is designed as a multiplier, a negative signal $-U_m$ being derived from the positive signal in an inverter 133. Three potentiometers 134 at which three selective color correction signals of both polarities $\pm Y_K$, $\pm M_K$ and $\pm C_K$ for the color separation signals Y, M, and C can be tapped are connected between the positive signal $+U_m$ and the negative signal $-U_m$, whereby the potentiometer setting determines both the degree of the correction as well as the direction of the correction.

The selective color correction signals $Y_K$, $M_K$, and $C_K$ are forwarded via lines 135 to a superimposition stage 136 in the signal path of the color separation signals Y, M, and C, the selective color correction signals $Y_K$, $M_K$, and $C_K$ being additively superimposed therein on the basic-corrected color separation signals Y, M, and C. The color separation signals Y', M', and C' corrected in this fashion are forwarded over final amplifiers 137 to recording elements 138 in the form of write lamps. Recording media 140, for example films, are clamped on a likewise rotating recording drum 139. The recording elements 138 whose brightnesses are modulated by the respectively allocated color separation signals Y', M', and C' move axially along the recording drum 139 in common and simultaneously undertake the point-by-point and line-by-line exposure of the films. The exposed and developed films are the desired color separations for the polychromatic mixed printing.

As extensively described to FIG. 1, that hue or that color of the color original which is to be subjected to an additional, selective color correction is defined in the recognition circuit 4 by means of demarcating a corresponding recognition region.

In the simplest case, the signal $+U_m$ formed in the mixing stage 129 corresponds to the recognition signal E. In an advantageous fashion, however, the signal $+U_m$ is additionally blended from at least one of the signals or components thereof which are acquired in the recognition circuit 4 and which are selectable by means of the switches 132. For example, the signal $+U_m$ is formed by means of multiplying the recognition signal E with the color saturation signal S' and is thus proportional to the color saturation.

The selective color correction signals $Y_K$, $M_K$, and $C_K$ reach their maximum values when the hue scanned in the color original 2 corresponds to the center of gravity hue $T_0$ selected for the selective color correction, and decrease with an increasing distance of the scanned hues from the center of gravity hue $T_0$. They reach the value zero when the scanned hues lie at the edge of the demarcated recognition region. One thus obtains progressive selective color correction signals which advantageously match the respective color progression.

FIG. 14 shows a further applied example of the circuit arrangement for the recognition of hues or colors according to FIG. 1 given a color scanner for the production of color separations for single color printing.

As already presented in the introduction to the specification, deviating for polychromatic mixed printing, each individual color to be printed in single color printing is blended before the printing process and the various discrete colors are applied to the print medium in separation operations. In single color printing, therefore, a corresponding color separation must be produced for every hue or every individual color of the color original to be inked, whereby the concern is that the color progression of the color original is reproduced as well as possible in the color separation.

The color original 2 from which the corresponding color separations for the single color printing are to be produced is situated on a rotating scanner drum 141 of a color scanner (not shown in greater detail) and is again tri-chromatically scanned point-by-point and line-by-line by the opto-electronic scanned element 1. The measured color value signals R, G, and B acquired in the scanning of the original proceed via lines 142 to the recognition circuit 4 according to FIG. 1. Let the recognition circuit 4 be respectively pre-set to that color of the color original 2, referred to below as separation hue or separation color, from which a color separation is to be momentarily recorded. The recognition circuit 4 then emits a corresponding recognition signal on a line 143.

The measured color value signals R, G, and B acquired in the opto-electronic scanning element 1 are simultaneously forwarded via the lines 142 to a logarithmizing stage 144 in which they are logarithmized or partially logarithmized. The logarithmizing stage 144 is followed by a correction circuit for color and/or gradation correction. This correction circuit 145 can, for example, be a color computer for polychromatic mixed printing. The correction circuit 14t generates color signals $F_1$, $F_2$, and $F_3$, depending upon the setting of the correction regulator in the correction circuit 145. This can correspond to the color separation signals Y, M, and C, to intermediate values or to the input, uncorrected measured color value signals R, G, and B. The color signals $F_1$, $F_2$, and $F_3$ are supplied to a selector switch 146 with which the color signal F best suited for the corresponding color separation (for example best reproduces the color progression of the separation hue or separation color) is selected for recording the color separation.

The individual color separation signal A arises by mixing the selected color signal F with a standardized voltage value W corresponding to the picture white (brightest white), and is mixed there in a mixing stage 147. The mixing ratio is dependent on the recognition signal E in accordance with the equation (9):

$$A = F \cdot E + (W - E). \tag{9}$$

The standardized voltage value W, for example $W=1$, is the standardized white level to which all three measured color value signals R, G, and B were matched when measuring the brightest, neutral picture location (white point) on the color original 2 during the white level calibration of the color scanner.

According to the curves shown in FIG. 4, the recognition signal E has a maximum value, for example $E_m = 1$, when scanning the separation hue in the color original 2, then decreases with the distance of the scanned hues from the separation hue and is equal to zero ($E = 0$) given hues lying outside of the demarcated hue recognition region.

Consequently, the individual color separation signal A according to equation (9) is identical to the selected color signal F when scanning the separation hue. Signal A is also an additive mixed signal of the selected color signal F and the standardized voltage value W given hues lying within the defined or limited hue recognition region. Accordingly, the mixing ratio is dependent on the distance of the scanned hue from the separation hue. Signal is also identical to the standardized voltage value W given hues lying outside of the hue recognition region. For the purpose of generating the individual color separation signal A, the selected color signal F is supplied to a modulator 148 in the mixing stage 147. The modulator 148, which is also charged with the recognition signal E on the line 143, is designed as a multiplier for the color signal F and recognition signal E. The product $F \cdot E = F'$ is forwarded to an adder stage 149 in which a voltage value W' dependent on the recognition signal E is added to the signal F'. For the formation of the voltage value $W' = (W - E)$, the standardized voltage value W corresponding to the picture white or white level is set at a potentiometer 150. The standardized voltage value W and the recognition signal E inverted in an inverter 151 are added in a further adder stage 152 in order to obtain the voltage value W'. The individual color separation signal A proceeds from the output of the mixing stage 153 to a write lamp as recording element 154 via a final amplifier 153. The write lamp, whose brightness is modulated by the individual color separation signal A, exposes a recording medium 155 (film) point-by-point and line-by-line, said recording medium being likewise clamped to a rotating recording drum 156. The exposed and developed film is the desired color separation.

A de-saturation of the colors or hues lying outside of the established recognition region is achieved in an advantageous fashion by means of the described way of forming the individual color separation signal. Simultaneously, the color progression or the color transition at color region boundaries of the color separation is improved such that the region boundaries are no longer recorded sharp, but rather in overlapping fashion. Due to the overlap, a zone of mixed printing arises in which the blended inks in discrete color printing are no longer printed side by side, but on top of one another, whereby disturbing color contours are avoided.

The production of color separations for discrete color printing is significantly improved by means of the individual adjustment of the curve of the recognition signal E as a function of color saturation and luminance on the one hand and, on the other hand, as a result of the controlled color de-saturation. For example, color separations for dark or light colors can be produced, whereby the light or dark colors are de-saturated or corrected to white. On the other hand, color separations for colors with lower or higher color saturation can be produced, such that the highly saturated or unsaturated colors are corrected to white.

While various minor changes and modifications might be proposed by those skilled in the art, it will be understood that we wish to include within the claims of the patent warranted hereon all such changes and modifications as reasonably come within our contribution to the art.

We claim as our invention:

1. A method for recognition of hues wherein a color surface is illuminated with light having a known spectral composition and intensities of three primary colors in received light are opto-electronically measured as measured color values which represent color coordinates of corresponding color loci in an RGB color space, wherein the measured color values are converted into chrominance and luminance values as color coordinates of corresponding color loci in a chrominance/luminance color space by means of a color space transformation, and wherein a hue recognition region is defined within the color space and the measured color loci or their color coordinates are checked as to whether they fall into the defined recognition region or not, comprising the steps of:

(a) before the actual hue recognition determining a color locus $F_0$ of a hue $T_0$ to be recognized by color values $R_0$, $G_0$, $B_0$;

(b) transforming the color locus $F_0$ of the hue $T_0$ to be recognized into the chrominance plane of the chrominance/luminance color space by a first transformation of its color values $R_0$, $G_0$, $B_0$ into corresponding chrominance values $x'_0$, $y'_0$, the color locus $F_0$ being transformed into a chrominance plane of the chrominance/luminance color space such that the transformed color locus $F'_0$ lies on one of the axis segments of an $X'Y'$ color coordinate system in the chrominance plane, and retaining transformation coefficients required therefor;

(c) and during actual hue recognition scanning the color surface point-by-point and line-by-line for acquisition of measured color values R, G, B;

(d) continuously transforming color loci F of the hues of the scanned colors into the chrominance plane by a second transformation, of the acquired measured color values R, G, B into corresponding chrominance values x', y', the color loci being transformed into the chrominance plane with the previously determined and retained transformation coefficients;

(e) selecting those chrominance values x', y' whose corresponding transformed color loci F' lie in a same half of the X'Y' color coordinate system as the transformed color locus $F'_0$ of the hue $T_0$ to be recognized;

(f) acquiring a hue signal T' by forming a quotient of absolute values of the selected chrominance values x',y', which respectively correspond to a tangent of an angle $\beta$ described by the corresponding axis segment and a connecting line between an origin of the color coordinate system and the transformed color locus F' of the hue of a scanned color, whereby the hue signal T' is a measure of the respective absolute value-wise deviation in hue of the hue of the scanned color from the hue to be recognized; and (g) acquiring a hue recognition signal E' by combining a substantially constant auxiliary control signal H with the hue signal T', said hue recognition signal E' having its highest values when scanning the hue $T_0$ to be recognized and having the value zero when scanning a hue having a prescribed, maximum hue deviation tan $\beta_g$, whereby a sector-shaped hue recognition region is defined with limits around the hue to be recognized.

2. A method according to claim 1 wherein the sector-shaped hue recognition region is defined with limits around the corresponding color coordinate system axis.

3. A method according to claim 1 including the step of fixing the color values of the hue $T_0$ to be recognized by opto-electronic measurement of a corresponding hue in the color surface.

4. A method according to claim 1 including the step of setting the prescribed, maximum hue deviation from the hue $T_0$ to be recognized or the aperture angle of the hue recognition region by amplitude variation of the chrominance value y' perpendicular to the corresponding axis segment of the hue signal T' or of the auxiliary control signal H.

5. A method according to claim 1 including the step of acquiring the hue recognition signal E' by difference formation between the auxiliary control signal H and the hue signal T'.

6. A method according to claim 1 including the step of providing the first transformation of the measured color values $R_0$, $G_0$, $B_0$ as color values of the hue $T_0$ to be recognized into the chrominance values $x_0$, $y_0$ (a) by matrixing the measured color values $R_0$, $G_0$, $B_0$ into the chrominance values $x_0$, $y_0$ of an XY color coordinate system in the chrominance plane corresponding to a transformation of the RGB color space into the chrominance/luminance color space according to the equations:

$x_0 = a_{11}R_0 + a_{12}G_0 + a_{13}B_0$ $y_0 = a_{21}R_0 + a_{22}G_0 + a_{23}B_0$ and (b) by a coordinate rotation of the chrominance values $x_0$, $y_0$ of the XY color coordinate system into the chrominance values $x'_0$, $y'_0$ of the X'Y' color coordinate system rotated relative to the XY color coordinate system by the angle $\alpha$, said coordinate rotation being dependent on the position of the color locus $F_0$ of the hue $T_0$ to be recognized within the chrominance plane, and corresponding to a rotation of the chrominance/luminance color space around the luminance axis Z, according to the equations:

$$x'_0 = x_0 \cos \alpha + y_0 \sin \alpha$$

$$y'_0 = -x_0 \sin \alpha + y_0 \cos \alpha$$

whereby the angle $\alpha = \alpha_0$ is defined so that the transformed color locus $F'_0$ of the hue to be recognized lies on one of the axis segments of the X'Y' color coordinate system.

7. A method according to claim 1 including the steps of providing the second transformation of the measured color values R, G, B of the hues of the scanned colors into the chrominance values x', y' of the transformed color loci F'
   (a) by a matrixing of the measured color values R, G, B into the chrominance values x, y of the XY color coordinate system in the chrominance plane corresponding to a transformation of the RGB color space into the chrominance/luminance color space according to the equations:

$$x = a_{11}R + a_{12}G + a_{13}B$$

$$y = a_{21}R + a_{22}G + a_{23}B$$

and
   (b) by a coordinate rotation of the chrominance values x, y of the XY color coordinate system into the chrominance values x', y' of the X'Y' color coordinate system by the identified angle $\alpha_0$, according to the equations:

$$x' = x \cos \alpha + y \sin \alpha$$

$$y' = -x \sin \alpha + \cos \alpha$$

8. A method according to claim 6 including the step of varying the angle $\alpha$ by an automatic balancing operation until one of the chrominance values $x'_0$ or $y'_0$ in the X'Y' color coordinate system becomes zero, whereby the angle $\alpha_0$ thus found is retained.

9. A method according to claim 1 including the step of deforming the hue signal T' before combination with the auxiliary control signal H.

10. A method according to claim 1 including the steps of
    (a) generating a color saturation signal S' from the measured color values R, G, B and generating a luminance signal L' from at least one of the measured color values R, G, B;
    (b) limiting the color saturation signal S' and luminance signal L' in terms of amplitude as a function of prescribed color saturation values and luminance values in order to obtain a color saturation control signal S* and a luminance control signal L*; and
    (c) combining at least one of the control signals S* or L* with the hue signal T' and the auxiliary control signal H in order to additionally control the hue recognition signal F' dependent upon the color saturation and/or the luminance.

11. A method according to claim 1 wherein for a color recognition,
    (a) combining the auxiliary control signal H with the hue control signal T*, the color saturation control signal S* and the luminance control signal L* to form a color recognition signal E''; and
    (b) setting the amplitude limitations of the control signals S* or L* such that the color recognition signal E'' differs from zero only within a three-dimensional color recognition region.

12. A method according to claim 11 including the step of forming the sum of hue control signal T*, color saturation signal S*, and luminance control signal L*, and subtracting the sum signal from the auxiliary control signal H.

13. A method according to claim 1 wherein for generating the color saturation signal S'
    (a) selecting the respective maximum and minimum measured color values from the measured color values R, G, B; and
    (b) forming the color saturation signal S' from the differences of the maximum and minimum measured color values.

14. A method according to claim 1 including the step of providing the auxiliary control signal H dependent on the color saturation values of the scanned colors in the color surface.

15. A method according to claim 14 including the step of providing the auxiliary control signal H as zero from the color saturation value zero up to a boundary color saturation value $x_g$ which defines the expanse of a gray region around the luminance axis Z of the chrominance/luminance color space and has a constant value $H_0$ from the boundary color saturation value $x_g$ up to the maximum color saturation value.

16. A method according to claim 1 including the step of employing the hue recognition signal E' or the color recognition signal E'' for the formation of selective color correction signals in the production of color separations for multicolor printing printing.

17. A method according to claim 1 including the step of employing the hue recognition signal E' or the color recognition signal E'' for the formation of color separation signals in the production of color separations for single color printing.

18. A recognition circuit system for recognition of hues wherein a recognition region for a hue to be recognized is defined within a color space and with which a determination is made by opto-electronic scanning of a color surface as to whether hues of the scanned colors fall into the defined recognition region or not, comprising:
    (a) a light source means of a known spectral composition for illumination of the colored surfaces to be investigated;
    (b) opto-electronic transducer means for acquisition of received intensities of three primary colors as measured color values;
    (c) a recognition circuit means connected to the opto-electronic transducer means for defining a recognition region for a hue to be recognized and for generating a recognition signal in case hues of the scahned colors fall into the recognition region; and
    (d) the recognition circuit means comprising:
       (i) a transformation circuit means connected to the opto-electronic transducer means for converting the measured color values $R_0, G_0, B_0$ or R, G, B into chrominance values $x'_0, y'_0$ or x', y' of an X'Y' color coordinate system in a chrominance plane of a chrominance/luminance color space;
       (ii) a selection and value circuit means connected to the transformation circuit means for selection and absolute value formation of chrominance values;

(iii) setting means for defining a hue recognition region and which is connected to the selection and value circuit means;
(iv) a divider stage means in communication with the setting means for formation of a hue signal T' from the absolute values of the selected chrominance values;
(v) a signal generator means for generating an auxiliary control signal; and
(vi) logic stage means connected to the divider stage means and to the signal generator means for acquiring a hue recognition signal E' from the auxiliary control signal H and the hue signal T'.

19. A recognition circuit system according to claim 18 wherein the logic stage means is designed as a differential stage.

20. A recognition circuit system according to claim 18 wherein a signal shaping stage means for the hue signal T' is positioned between the divider stage means and the logic stage means.

21. A recognition circuit system according to claim 18 wherein the recognition circuit means additionally comprises:
(a) a color saturation signal generator means and a luminance signal generator means connected to the opto-electronic transducers for acquiring a color saturation signal S' and a luminance signal L' from the measured color values R, G, B;
(b) variable limiter stage means connected following the signal generator means for generating a color saturation control signal S* and a luminance control signal L* by amplitude limitation; and
(c) switch means connected to the limiter stage means and to the logic stage means for the selective combination of one of the color saturation control signal or the luminance control signal L* with the hue signal T' and the auxiliary control signal H in order to generate a color recognition signal E''.

22. An apparatus for recognition of hues wherein a color surface is illuminated with light having a known spectral composition and intensities of three primary colors in received light are opto-electronically measured as measured color values which represent color coordinates of corresponding color loci in an RGB color space, comprising:
(a) means for converting the measured color values into chrominance and luminance values as color coordinates of corresponding color loci in a chrominance/luminance color space by a color space transformation;
(b) means for defining a hue recognition region within the color space and the measured color loci or their color coordinates, and checking as to whether they fall into the the defined recognition region or not;
(c) means for determining before the actual hue recognition a color locus $F_0$ of a hue $T_0$ to be recognized by color values $R_0$, $G_0$, $B_0$;
(d) means for transforming the color locus $F_0$ of the hue $T_0$ to be recognized into the chrominance plane of the chrominance/luminance color space by a first transformation of its color values $R_0$, $G_0$, $B_0$ into corresponding chrominance values $x'_0$, $y'_0$, the color locus $F_0$ being transformed into chrominance plane of the chrominance/luminance color space such that a transformed color locus $F'_0$ lies on one of axis segments of an X'Y' color coordinate system in the chrominance plane, and retaining transformation coefficients required therefor;
(e) means for scanning before actual hue recognition the color surface point-by-point and line-by-line for acquisition of measured color values R, G, B;
(f) means for continuously transforming color loci F of the hues of the scanned colors into the chrominance plane, by a second transformation of the acquired measured color values R, G, B, into the chrominance values x',y' the color loci being transformed into the chrominance plane with the previously determined and retained transformation coefficients;
(g) means for selecting those chrominance values x', y' whose corresponding transformed color loci F' lie in a same half of the X'Y' color coordinate system as the transformed color locus $F'_0$ of the hue $T_0$ to be recognized;
(h) means for acquiring a hue signal T' by forming a quotient of absolute values of the selected chrominance values x',y', which respectively correspond to a tangent of an angle $\beta$ described by the corresponding axis segment and a connecting line between an origin of the color coordinate system and the transformed color locus F' of the hue of a scanned color, whereby the hue signal T' is a measure of the respective value-wise deviation in hue of the hue of the scanned color from the hue to be recognized; and
(i) means for acquiring a hue recognition signal E' by combining a substantially constant auxiliary control signal H with the hue signal T', said hue recognition signal E' having its highest values when scanning the hue $T_0$ to be recognized and having the value zero when scanning a hue having a prescribed, maximum hue deviation tan $\beta_g$, whereby a sector-shaped hue recognition region is defined with limits around the hue to be recognized.

23. A method for recognition of hues wherein a recognition region for a hue to be recognized is defined within a color space and with which a determination is made by opto-electronic scanning of a color surface as to whether hues of the scanned colors fall into the defined recognition region or not, comprising the steps of:
(a) illuminating the colored surfaces to be investigated;
(b) acquiring received intensities of three primary colors as measured color values;
(c) converting the measured color values $R_0$, $G_0$, $B_0$ or R, G, B into chrominance values $x'_0$, $y'_0$ or x', y' of an X'Y' color coordinate system in a chrominance plane of a chrominance/luminance color space;
(d) selecting and forming the chrominance values;
(e) defining the hue recognition region for a hue to be recognized;
(f) forming a hue signal T' from the selected chrominance values;
(g) generating an auxiliary control signal H; and
(h) acquiring a hue recognition signal E' from the auxiliary control signal H and the hue signal T', said hue recognition signal E' being generated when hues of a scanned color fall into the recognition region.

* * * * *